Dec. 2, 1952 — S. SCHNELL — 2,620,049
BRAKE SHOE ADJUSTING MECHANISM
Filed Dec. 18, 1946

INVENTOR:
STEVE SCHNELL
BY S. E. Huffman
ATTORNEY.

Patented Dec. 2, 1952

2,620,049

UNITED STATES PATENT OFFICE 2,620,049

BRAKE SHOE ADJUSTING MECHANISM

Steve Schnell, Kirkwood, Mo., assignor to Wagner Electric Corporation, St. Louis, Mo., a corporation of Delaware Application December 18, 1946, Serial No. 716,987

7 Claims. (Cl. 188—79.5)

This invention relates to a brake mechanism and in its more specific aspects is directed to a device for automatically adjusting the clearance between a brake shoe and the cooperating drum.

The object of this invention is to provide a brake shoe adjusting mechanism for maintaining a substantially constant clearance during deenergized periods between the brake shoe and the cooperating brake drum which is operative only after a predetermined wear of the friction element has occurred and which is inoperative at all other times. The mechanism is provided with a pivoted brake drum contacting member which actuates the adjusting mechanism after a predetermined brake lining wear and re-positions the brake shoe to maintain said constant clearance.

Figure 1:
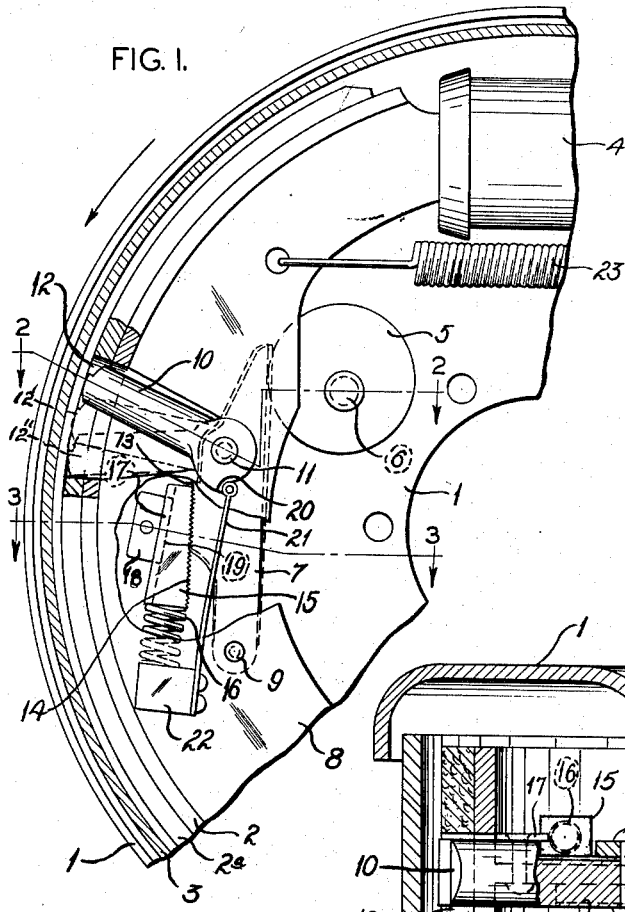
Figure 2:
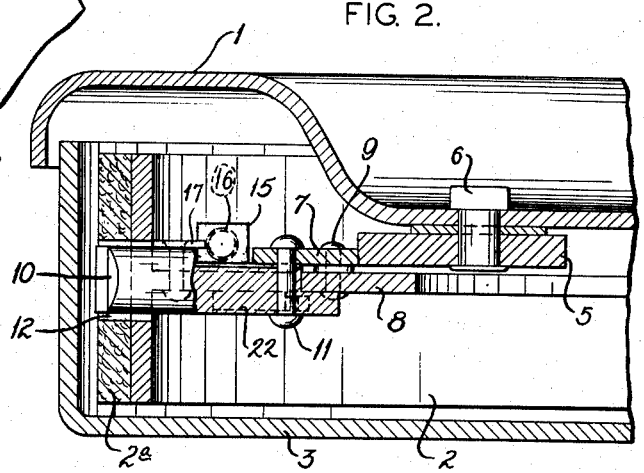
Figure 3:
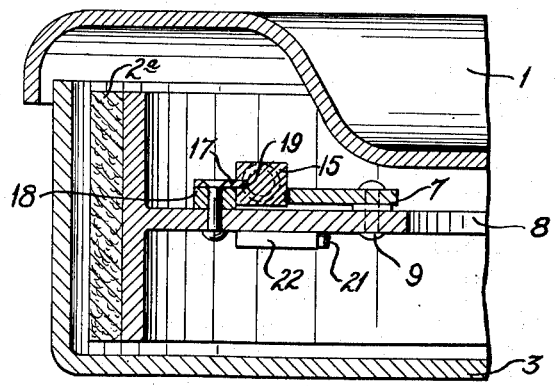

In the drawings Figure 1 shows an elevational view, partly in section, of a portion of a brake assembly incorporating the invention;

Figure 2 is a sectional view taken substantially along the line 2—2 of Figure 1; and Figure 3 is a sectional view taken substantially along the line 3—3 of Figure 1.

Referring now to the drawings, numeral 1 designates a backing plate on which a brake shoe 2 carrying a lining or friction element 2a is pivotally supported, as is well known in the art. 3 is a brake drum and 4 is a brake applying motor mounted on backing plate 1, all of which is conventional in the art.

An eccentric 5 is mounted in backing plate 1 on a pin 6 and constitutes an adjustable fixed stop for brake shoe 2. Eccentric 5 is provided to initially adjust the clearance between brake shoe 2 and drum 3 and to determine the "off" position of brake shoe 2.

A lever 7 is pivoted to a pin 9 fixed in web 8 of shoe 2. The unpivoted end of lever 7 is engaged and supported by eccentric 5. A brake drum contacting member 10 is pivoted to lever 7 by means of a pin 11. Member 10 is arranged in a suitable aperture 12 formed in the brake shoe 2 to enable member 10 to engage drum 3 when the friction element 2a is sufficiently worn.

Lever 7 is provided with a serrated surface 13 which cooperates with a like serrated surface 14 on wedge 15. Spring 16 is provided to move wedge 15 which may have a 10°–20° taper toward the unpivoted end of lever 7 and reacts upon a suitable abutment (not shown) secured to web 8. A thrust member 18 is pivotally mounted on web 8 and tongue 17 formed thereon is disposed in slot 19 in wedge 15 to assist in maintaining wedge 15 aligned. Member 18 also absorbs the upward thrust from spring 21. This upward thrust of spring 21 maintains members 7, 15, and 18 in position during period of non-adjustment.

Member 10 is provided with a lever arm 20 which is engaged by the free end of a leaf spring 21 secured at its other end to an abutment 22 fastened on web 8. Leaf spring 21 rotates member 10 in a clockwise direction, as viewed in Figure 1, and tends to maintain it in the full position shown.

Referring now to the operation of the device and assuming that brake shoe 2 and friction element 2a have been worn approximately four-thousandths of an inch, the shoe will be ready for adjustment. The shoe will be adjusted outwardly approximately four-thousandths of an inch when the taper angle of wedge 15 is substantially sixteen degrees and the serration depth is substantially six-thousandths of an inch and with the radius of brake shoe 2, the length of lever 7, and the length of brake drum contacting member 10 suitably proportioned. When shoe 2 is now moved outwardly by motor 4 into engagement with brake drum 3, the brake drum contacting member 10 contacts brake drum 3. Lever 7 is not in engagement with eccentric 5 when brake shoe 2 engages the brake drum and the distance between the unpivoted end of lever 7 and stop 5 is then substantially equal to the clearance between brake drum 3 and the drum engaging surface of friction element 2a. The rotative movement of the brake drum in the direction of the arrow will, therefore, rotate the brake drum contacting member 10 about pin 11. When the longitudinal axis of member 10 is aligned with the radii of shoe 2 and drum 3, lever 7 will have rotated clockwise about pin 9 producing maximum inward movement of lever 7 toward stop 5 and causing the serrated surfaces 13 and 14 to be separated.

During the period of serration separation spring 16 will move wedge 15 upward, as viewed in Figure 1, to the next serration positon. The upward movement of wedge 15 is limited to one serration because the tip of the succeeding serration will prevent further upward movement of wedge 15. The clearance between the unpivoted end of lever 7 and stop 5 will, therefore, be reduced by approximately four-thousandths of an inch and when spring 23 retracts brake shoe 2 to brake disengaged position, it will be substantially four-thousandths of an inch closer to the drum. As brake shoe 2 retracts, leaf spring 21 will return the brake drum contacting member 10 to the full line position in Figure 1 and will also lock the thrust member 18, wedge 15 and lever 7 in engagement and no further adjustment will occur until the friction element 2a has again worn down four-thousandths of an inch.

Slot 12 in web 8 and the friction element receiving portion of brake shoe 2 and friction element 2a is shown in Figure 1 as of a size to permit the brake drum contacting member 10 to go to the dotted line position 12″ in which position the unpivoted end of member 10 is disengaged from drum 3. However, it may be desirable under some circumstances to narrow slot 12 to such an extent that it will limit the rotative movement of member 10 to a position substantially that of 12′ which is approximately the position wherein the longitudinal axis of the brake drum contacting member 10 is in substantial alignment with one of the radii of brake drum 3.

Having fully described my invention, that which I claim as novel and desire to protect by Letters Patent of the United States is:

1. A brake mechanism comprising a drum, a brake shoe provided with a lining engageable with said brake drum, an "off" position stop member, a lever, one end thereof being pivoted to said shoe and the other end engaging said stop member when said lining is disengaged from the drum, a brake drum contacting member pivoted to said lever at the unpivoted end thereof and contactable with the drum at a point ahead of a radius of the drum which passes through said drum contacting member pivot point after a predetermined lining wear and arranged to travel through an arcuate path to a point beyond said drum radius upon contacting said drum, thereby moving the free end of said lever inwardly, means for biasing said drum contacting member to its "rest" position; and means for preventing the return of said lever end to its original position with respect to said shoe.

2. A brake adjusting mechanism comprising a brake drum, a brake shoe provided with a lining engageable with said brake drum, an "off" position stop member for said shoe, a lever, one end thereof pivoted to said shoe and the other end engaging said stop member when said lining is disengaged from said drum, a pin secured in said lever near the other end thereof, a brake drum contacting member rockably mounted on said pin and contactable with said drum ahead of a line passing through said pin and the center of said drum; a thrust member secured to said shoe; and a spring pressed wedge disposed between said thrust member and said lever for holding said lever in adjusted position, said lever being adjusted by said contacting member when it is rocked about said pin after said contacting member engages said drum.

3. A brake mechanism comprising a brake drum, a brake shoe provided with a lining engageable with the brake drum and having a circumferential slot therein, an "off" position stop member for the brake shoe, a lever, one end thereof being pivoted to said brake shoe and the other end engaging said stop member when said lining is disengaged from the drum, a brake drum contacting member extending through said slot pivoted to said lever near the other end thereof and contactable with said drum at a point ahead of a line passing through the center of the drum and through the pivoting axis of said brake drum contacting member, said brake drum contacting member contacting said drum after a predetermined lining wear so that said drum will pivot said member for adjusting said lever while said contact member is being rotated to drum disengaged position, a thrust member secured to said shoe, a wedge disposed between said thrust member and said lever, a spring anchored on said shoe and engaging said wedge for acting on said wedge for changing its position between said lever and said thrust member when said brake drum contacting member is actuated by the brake drum; and means for maintaining said lever, wedge, and thrust member in operative engagement.

4. A brake mechanism comprising a brake drum, a brake shoe provided with a lining engageable with the brake drum and having an elongated circumferential slot therein, an "off" position stop member for the brake shoe, a lever, one end thereof being pivoted to said shoe and the other end engaging said stop member when said lining is disengaged from the drum, a pin in said lever near the other end thereof, a brake drum contacting member extending through said slot normally in operative position and rotatably mounted on said pin, said member contactable with said drum at a point ahead of a line passing through said pin and the center of said drum after a predetermined lining wear, the drum rotating said member from inoperative position to a point on the other side of said line at which point said member is disengaged from said drum, a thrust member secured to said shoe, a wedge disposed between said thrust member and said lever, a spring anchored on said shoe and engaging said wedge for moving said wedge to a different position when said brake drum contacting member is actuated by the brake drum and is coaxial with said line passing through said pin and the center of said drum; and another spring anchored to said shoe and engaging said brake drum contacting member for returning said brake drum contacting member to inoperative position after said shoe is disengaged from the drum and for maintaining the adjusted position of said lever relative to said stop member.

5. A brake mechanism comprising a brake shoe provided with a lining engageable with the brake drum and having an aperture in said lining and shoe elongated in the direction of movement of the drum, an "off" position stop member for said brake shoe, a lever, one end thereof being pivoted to said shoe and the other end engaging said stop member when said lining is disengaged from the brake drum, a brake drum contacting member pivoted to said lever near the other end thereof extending through said slot and contactable with said drum at a point ahead of a line passing through the point of pivoting of said member and the center of said drum after a predetermined lining wear, said drum pivoting said member about the pivot to drum-disengaged position when said lining is being engaged by said drum for adjusting the position of said lever, a thrust member secured to said shoe, a wedge disposed between said lever and said thrust member for maintaining the adjusted position of said lever relative to the drum, the adjustment occurring when said contacting member is coaxial with said line passing through the pivotal axis thereof and through the center of said drum, a spring anchored on said shoe and in engagement with said wedge for moving said wedge to a different position when said brake drum contacting member is actuated by said drum, and a spring anchored to said shoe and in engagement with said contacting member for reversely moving the contacting member after said shoe is disengaged from said drum.

6. A brake mechanism comprising a brake drum, a brake shoe provided with a lining each having an aligned elongated slot therein and engageable with the brake drum, an "off" position stop member for the brake shoe, a lever, one end thereof being pivoted to said shoe and the other end engaging said stop member when said lining is disengaged by the drum, a pin secured in the unpivoted end of said lever, a brake drum contacting member extending through said slot and normally in inoperative position and supported on said pin and contactable with said drum at a point ahead of a line passing through said pin and the center of said drum after a predetermined lining wear, said drum rotating said member about said pin from inoperative position to drum-disengaged position when said lining is engaging said drum, said lever being adjusted during the time said brake drum contacting member is being rotated, a thrust member on said shoe, a wedge disposed between said lever and said thrust member, a spring anchored to said shoe and in engagement with said wedge for moving said wedge to a different position when said brake drum contacting member is being rotated by said drum; and spring means anchored to said shoe and in engagement with said contacting member for returning said brake drum contacting member to inoperative position after said lining is disengaged from the drum.

7. A brake mechanism comprising a brake drum, a brake shoe provided with a lining engageable with the brake drum, an "off" position stop member for said shoe, a lever, one end thereof being pivoted to said shoe and the other end engaging said stop member when said lining is disengaged from the drum, a pin secured to the unpivoted end of said lever; and a brake drum contacting member pivoted to said pin and contactable with the drum after a predetermined lining wear at a point on said drum ahead of a line passing through the center of the drum and said pin and movable to drum disengaged position at a point beyond said line, said lever being adjusted during the time said brake drum contacting member is being pivoted by said drum.

STEVE SCHNELL.

REFERENCES CITED

The following references are of record in the file of this patent:

UNITED STATES PATENTS

| Number | Name | Date |
|---|---|---|
| 2,158,804 | Schnell | May 16, 1939 |
| 2,199,269 | Page | Apr. 30, 1940 |
| 2,221,090 | Goepfrich | Nov. 12, 1940 |